United States Patent
Kinoshita et al.

(10) Patent No.: US 7,690,024 B2
(45) Date of Patent: Mar. 30, 2010

(54) AUTHENTICATED DEVICE AND INDIVIDUAL AUTHENTICATION SYSTEM

(75) Inventors: Atsuhiro Kinoshita, Kamakura (JP); Kazuya Matsuzawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1086 days.

(21) Appl. No.: 11/350,075

(22) Filed: Feb. 9, 2006

(65) Prior Publication Data
US 2006/0212709 A1   Sep. 21, 2006

(30) Foreign Application Priority Data
Feb. 9, 2005   (JP)   ............... 2005-033338

(51) Int. Cl.
*G06K 19/06* (2006.01)
*G06F 21/00* (2006.01)
(52) U.S. Cl. ............... 726/2; 341/144; 349/43
(58) Field of Classification Search .......... 341/144; 726/9; 349/43
See application file for complete search history.

(56) References Cited

U.S. PATENT DOCUMENTS 6,484,948 B1 * 11/2002 Sonoda ............ 235/492
6,703,953 B2   3/2004 Maeda et al.
2003/0160715 A1 * 8/2003 Maeda et al. ............ 341/144
2004/0217375 A1 * 11/2004 Yokogawa et al. .......... 257/192

FOREIGN PATENT DOCUMENTS
JP   8-315355   11/1996
JP   2001-7290   1/2001

OTHER PUBLICATIONS

S. Maeda et al., "An Artifical Fingerprint Device (AFD) Module using Poly-Si Thin Film Transistors with Logic LSI Compatible Process for Built-in Security," IEDM (2001), pp. 34.5.1-34.5.4.
K. Lofstrom et al., "IC Identification Circuit using Device Mismatch," ISSCC (2000), pp. 372-373.
Notification of the First Office Action issued by the Chinese Patent Office on Mar. 7, 2008, for Chinese Patent Application No. 200610004581.1, and English-language translation thereof.
Notification of Reasons for Rejection issued by the Japanese Patent Office on Jul. 10, 2009, for Japanese Patent Application No. 2005-033338, and English-language translation thereof.

* cited by examiner

*Primary Examiner*—Michael J Simitoski
*Assistant Examiner*—Joshua Watson
(74) *Attorney, Agent, or Firm*—Finnegan, Henderson, Farabow, Garrett & Dunner, L.L.P.

(57) ABSTRACT

It is made possible to prevent "spoofing" and incur no additional management cost as effectively as possible. An authenticated device includes: at least one authenticated element that generates an output signal with characteristics spontaneously varying, at the time of manufacturing, with respect to a continuous input signal. The characteristics of the authenticated element are used as information unique to an individual.

10 Claims, 13 Drawing Sheets

AUTHENTICATED DEVICE AND INDIVIDUAL AUTHENTICATION SYSTEM

CROSS-REFERENCE TO RELATED APPLICATION

This application is based upon and claims the benefit of priority from prior Japanese Patent Application No. 2005-33338 filed on Feb. 9, 2005 in Japan, the entire contents of which are incorporated herein by reference.

BACKGROUND OF THE INVENTION

1. Field of the Invention

The present invention relates to an authenticated device and an individual authentication system.

2. Related Art

As this information-oriented society has rapidly become sophisticated and an increasing amount of information is being digitized, there is a strong demand for reliable individual authentication systems. An "individual authentication system" is a mechanism that includes an authenticated device that stores at least information unique to an individual (such as an ID number), and an authenticating device that reads the information and authenticates the individual. In the case of a credit card or a mobile phone handset, for example, it is necessary to authenticate the credit card or the mobile phone handset based on ID information, before a service is provided. The ID information cannot be kept secret, as it needs to be read out. However, if the ID information can be easily replicated, it becomes difficult to guarantee the credibility of the authenticated device. Therefore, it is necessary to develop an individual authentication system with which the credibility is guaranteed and the information as to the individual cannot be replicated.

In view of this background, individual authentication systems that use the spontaneous variations in characteristics of transistors integrated on LSIs as random-number ID information have been disclosed in "IC Identification Circuit using Device Mismatch, K. Lofstrom, et al., Tech. Dig. ISSCC 2000, WP 22.6, p 372 (2000)", "An Artificial Fingerprint Device (AFD) Module using Poly-Si Thin Film Transistors with Logic LSI Compatible Process for Built-in Security, S. Maeda, et al., Tech. Dig. IEDM 2001, 34.5.1, p 759 (2001)", and Japanese Patent Laid-Open Publication No. 2001-7290, for example.

In the above three references, the spontaneous variations in threshold values of transistors at the time of manufacturing are used. Digital information of "1" and "0" is allotted to the threshold value information, so as to randomly set a numeric value to each device. More specifically, whether the current value obtained in an operation of the transistor under desired operating conditions is larger than a certain value is indicated by the information of "1" and "0".

Since the characteristics of each transistor element are represented by "1" or "0" in the references, the information can be easily replicated in practice. If the internal information of "1" and "0" is output directly or the characteristics of each transistor can be read out by some means, the digital information is replicated so as to produce a "spoofing" device that can be recognized as the same individual as the original when seen from the outside. Replication of digital information is not very difficult in technical terms, as a general-purpose ROM such as a flash memory can be used in doing so.

Moreover, the information in the individual is used for identification in the references. When authentication is to be performed via a network such as the Internet, data might be stolen along the way. So as to prevent "spoofing", the number of bits in the data needs to be increased to a very large number. This leads to a huge increase in information management cost on the authentication side.

SUMMARY OF THE INVENTION

An object of the present invention is to provide an authenticated device and an individual authentication system that can prevent "spoofing" and incur no additional management cost as effectively as possible.

An authenticated device according to a first aspect of the present invention includes: at least one authenticated element that generates an output signal with characteristics spontaneously varying, at the time of manufacturing, with respect to a continuous input signal, the characteristics of the authenticated element being used as information unique to an individual.

The authenticated element can be at least one of a Schottky diode, a single electron transistor, a Schottky transistor, a Schottky diode with a gate, and a tunnel diode with insulating film.

A device with authenticated elements according to a second aspect of the present invention includes: an array in which a plurality of the authenticated elements described above are arranged in a matrix form; and a selecting circuit that selects at least one authenticated element from the array.

An individual authentication system according to a third aspect of the present invention includes: an authenticated device that includes at least one authenticated element that generates an output signal with characteristics spontaneously varying, at the time of manufacturing, with respect to a continuous input signal, the characteristics of the authenticated element being used as information unique to an individual; and an authenticating device that inputs a variable authentication signal as the input signal to the authenticated element of the authenticated device, and performs individual authentication on the authenticated device, based on the output signal from the authenticated element.

The authenticating device can include a signal generating circuit that generates the authentication signal and a comparator circuit that compares the output signal from the authenticated element with a reference signal, and performs individual authentication on the authenticated device, based on an output of the comparator circuit.

The output of the comparator circuit can be digital data unique to the authenticated element, the digital data being set in accordance with the output signal from the authenticated element and the reference signal.

The authenticated device can include a plurality of the authenticated elements; and the authenticating device transmits a signal to select at least one authenticated element from the plurality of authenticated elements, and includes a unit that performs individual authentication on the authenticated device, based on the output of the comparator circuit in response to the output signal of the selected authenticated element.

Two or more authenticated elements can be selected from the authenticated elements.

The authenticating device can include a reference signal generating circuit that generates the reference signal.

An individual authentication system according to a fourth aspect of the present invention includes: a first authenticated unit that includes a first array in which authenticated elements that generate output signals with characteristics spontaneously varying, at the time of manufacturing, in response to a continuous input signal are arranged in a matrix form, and a first selecting circuit that selects at least one authenticated element from the first array; a second authenticated unit that includes a second array in which authenticated elements that generate output signals with characteristics spontaneously varying, at the time of manufacturing, in response to a continuous input signal are arranged in a matrix fashion, and a second selecting circuit that selects at least one authenticated element from the second array; an operating unit that transmits a first element designating signal to the first selecting circuit to designate an authenticated element in the first array, and a second element designating signal to the second selecting circuit to designate an authenticated element in the second array, so that authenticated elements are selected from both the first array and the second array; a first authentication signal generating circuit that generates and transmits a first authentication signal to the authenticated element selected from the first array; a second authentication signal generating circuit that generates and transmits a second authentication signal to the authenticated element selected from the second array; and a comparator circuit that compares a first output of the authenticated element selected from the first array with a second output of the authenticated element selected from the second array, the first output being made in response to the first authentication signal, the second output being made in response to the second authentication signal.

DESCRIPTION OF THE EMBODIMENTS

Prior to a description of individual authentication systems in accordance with the present invention, the principles of authentication employed in each of the embodiments of the present invention are described.

Figure 2:
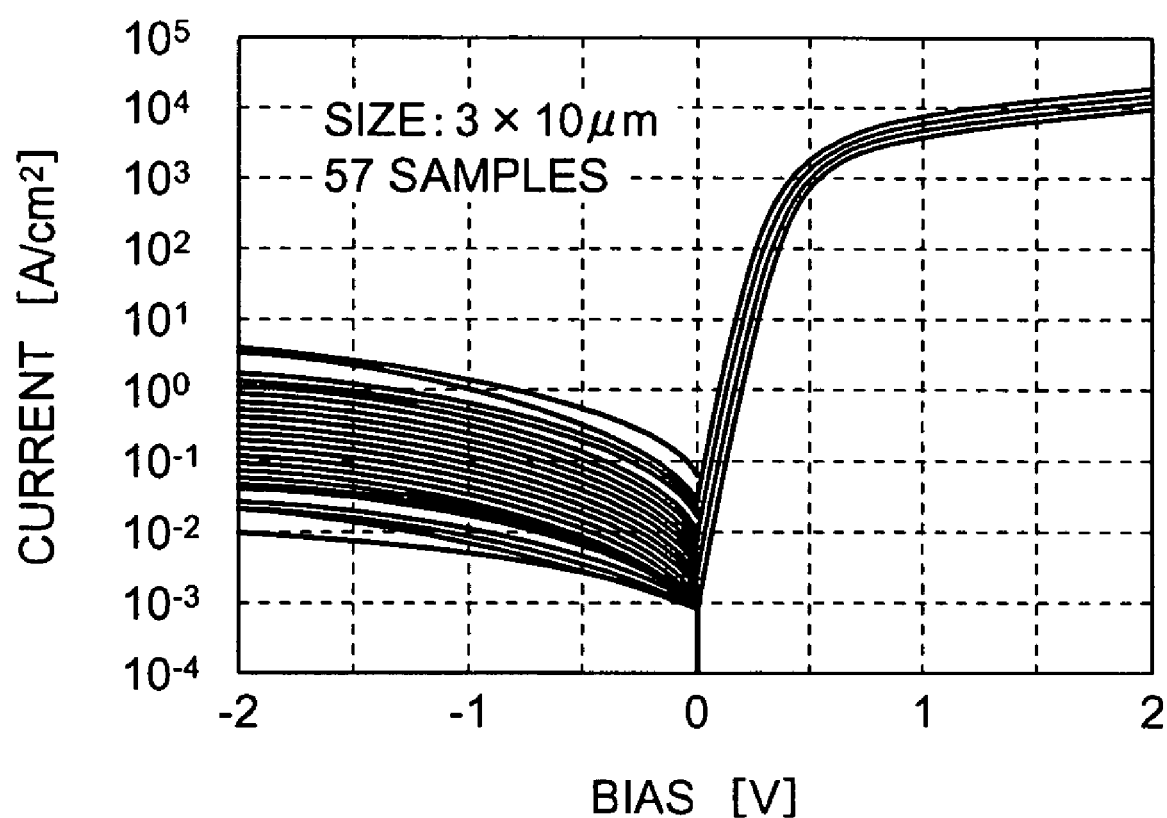
FIG. 2 is a graph showing a variation in current with respect to a bias in Schottky diodes.

In each of the embodiments of the present invention, the current-voltage characteristics of Schottky diodes are used for individual authentication. FIG. 2 shows the current-voltage characteristics of 57 Schottky diodes that are produced on a wafer. As can be seen from FIG. 2, the variation in current when a forward bias is applied to those Schottky diodes is not wide, but the variation in current when a reverse bias is applied is wide. The variations in current of those Schottky diodes occur spontaneously. As described below, the density and the junction size of the Schottky diodes are selected so as to spontaneously achieve a wide variation in device characteristics. Such a spontaneous variation is used to improve the security in individual authentication.

Figure 3:
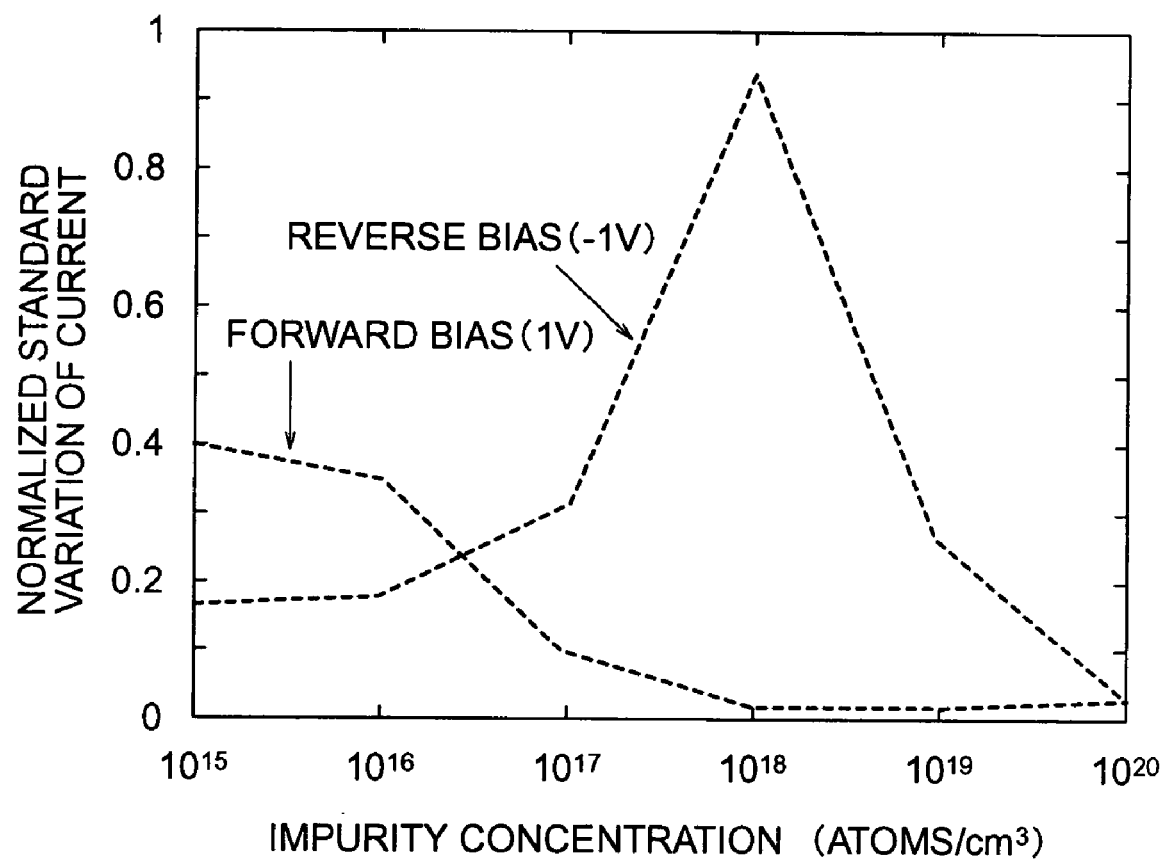
FIG. 3 is a graph showing variations in current with respect to the impurity concentration in Schottky diodes.

So as to maximize the effect of the use of Schottky diodes in individual authentication, it is necessary to appropriately adjust the junction area and the impurity concentration in the semiconductor. As the junction area becomes smaller, the variation in characteristics becomes wider. Therefore, it is preferable to employ devices with small junction area. However, the current becomes lower in proportion to the junction area, and it is necessary to appropriately choose the devices in accordance with the accuracy of the authentication system. The variation in characteristics greatly affects the impurity concentration. FIG. 3 shows the relationship between the variation and the impurity concentration. The graph in FIG. 3 is formed by standardizing the variations in current where Schottky diodes having different impurity concentrations in semiconductors were produced, and the current flowing in the Schottky diodes when a forward bias was applied to those Schottky diodes and the current flowing in the Schottky diodes when a reverse bias was applied to those Schottky diodes were measured. As can be seen from FIG. 3, so as to achieve the widest variation possible, a negative bias should be applied to Schottky diodes having a concentration of approximately $10^{18}$ cm$^{-3}$.

Figure 4:
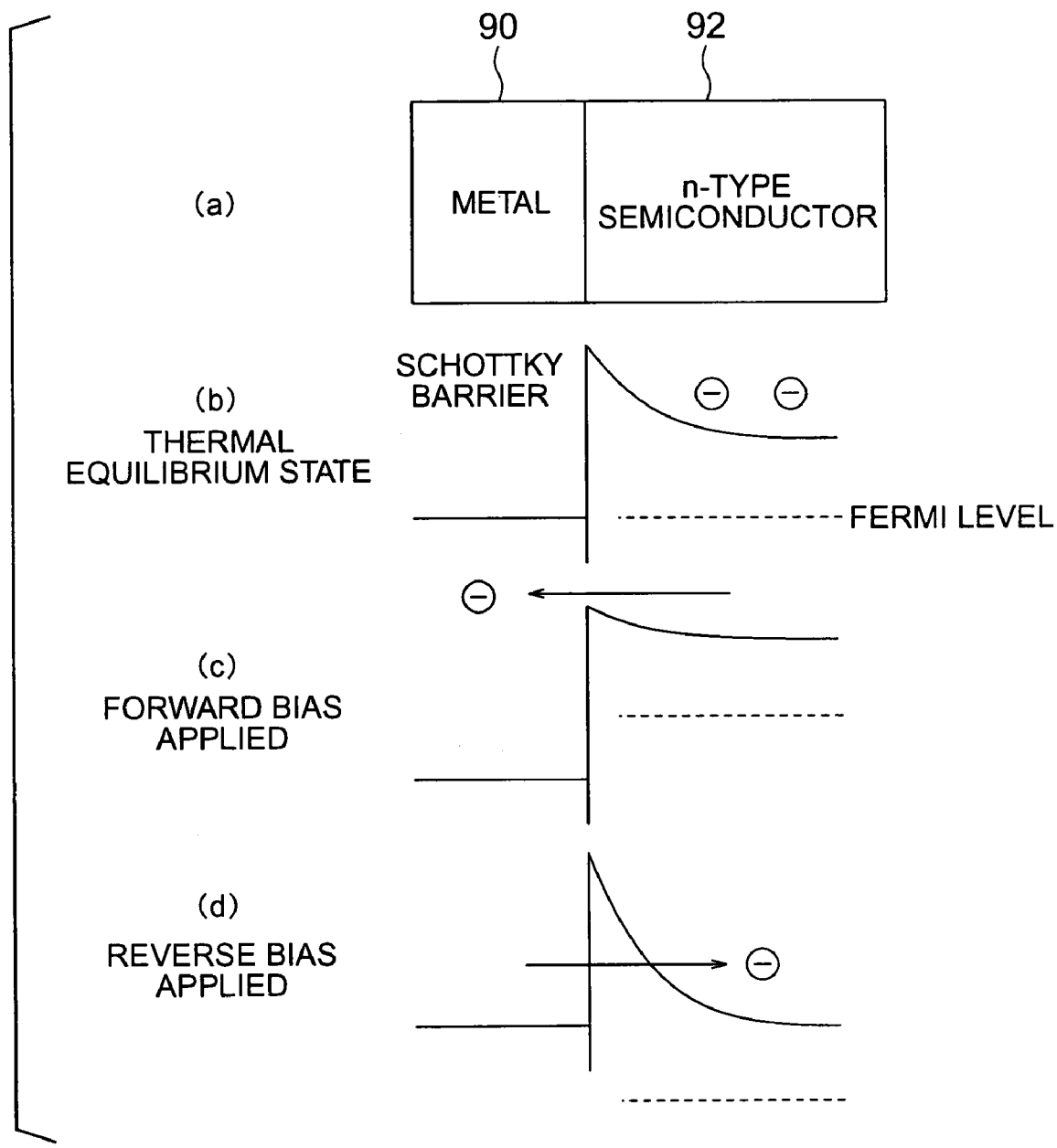
FIGS. 4(a) through 4(d) illustrate the principles of the characteristics of Schottky diodes spontaneously varying at the time of manufacturing.

Next, the principles of the spontaneous wide variation in characteristics of Schottky diodes at the time of manufacturing are described, with reference to FIGS. 4(a) through 4(d). The current characteristics of a Schottky diode having a junction unit of a metal 90 and an n-type semiconductor 92 joined to each other shown in FIG. 4(a) are represented by the energy band charts shown in FIGS. 4(b), 4(c), and 4(d). FIG. 4(b) shows the energy band observed when the Schottky diode is in a thermal equilibrium state. FIG. 4(c) shows the energy band observed when a forward bias is applied to the Schottky diode. FIG. 4(c) shows the energy band observed when a reverse bias is applied to the Schottky diode. As can be seen from FIGS. 4(b), 4(c), and 4(d), when a forward bias is applied to the Schottky diode, thermal electrons flow from the n-type semiconductor 92 to the metal 90 (see FIG. 4(c)), and when a reverse bias is applied to the Schottky diode, a current flows as electrons tunnel through the Schottky barrier from the metal 90 to the n-type semiconductor 92 (see FIG. 4(d)). As a bias is applied, a current flows as carriers (electrons in the examples shown in FIGS. 4(b), 4(c), and 4(d)) tunnel through the Schottky barrier in the directions indicated by arrows. In this specification, thermionic emission and tunneling current are not distinguished from each other, and are both described as tunneling. Accordingly, the current flowing through Schottky diode is determined by the probability of carriers tunneling through the Schottky barrier. The tunneling probability is greatly affected by the thickness of the Schottky barrier.

Figure 5:
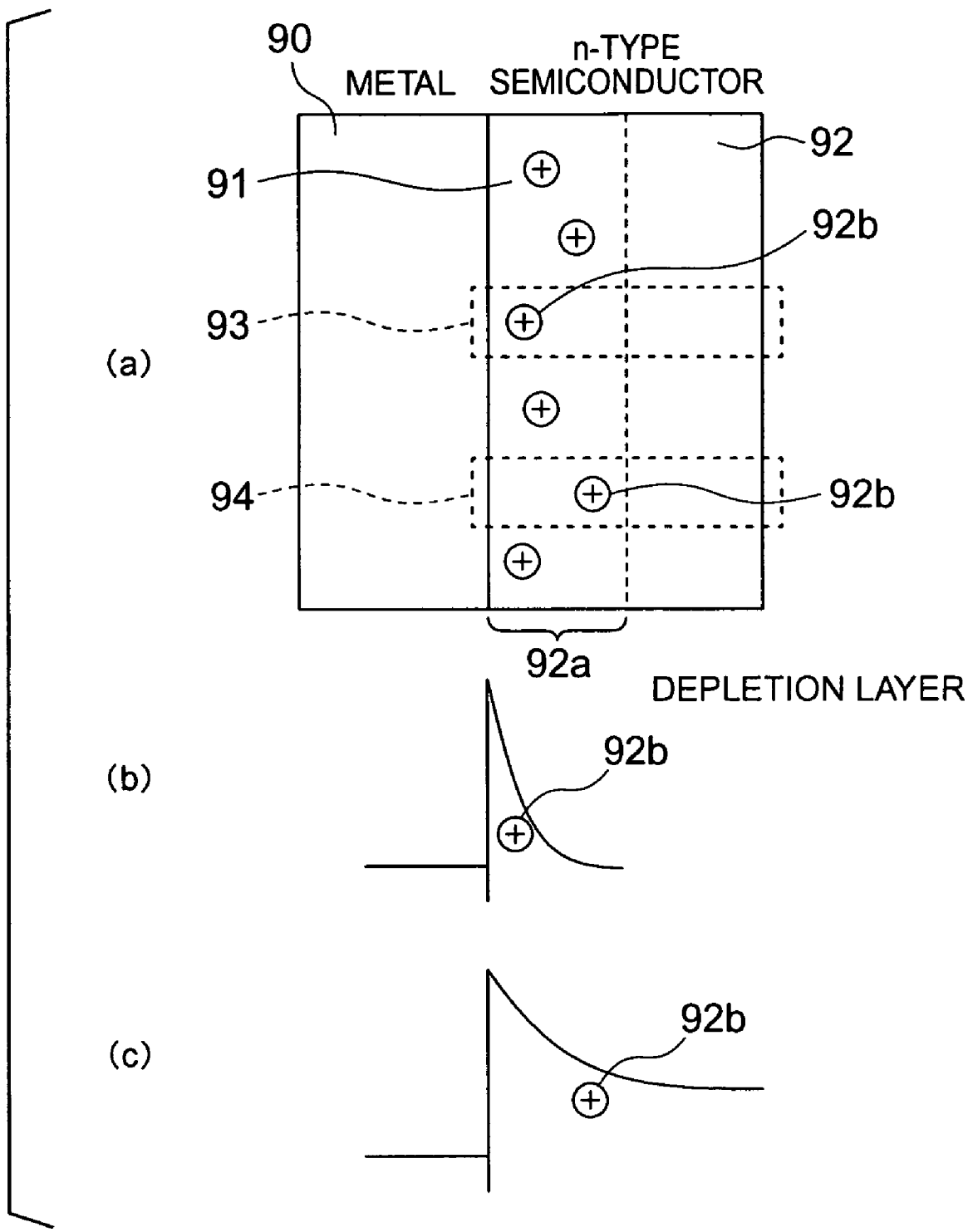
FIGS. 5(a) through 5(c) illustrate the micro thickness of the Schottky barrier.

FIGS. 5(a), 5(b), and 5(c) show the micro thickness of the Schottky barrier seen in the direction of the depth of the interface. FIG. 5(a) is a schematic cross-sectional view of a Schottky diode having a junction unit of a metal 90 and an n-type semiconductor 92 joined to each other. FIGS. 5(b) and 5(c) are energy band diagrams of the Schottky barrier in regions indicated by reference numerals 93 and 94 in FIG. 5(a).

As can be seen from FIGS. 5(a), 5(b), and 5(c), the thickness of the Schottky barrier is not uniform. More specifically, the distance between an interface 91 and impurity ions 92b in a depletion layer 92a formed by the Schottky barrier statistically varies. For example, the tunneling probability in the region 93 in which the impurity ions 92b are closer to the interface 91 is much higher than in the region 94 (see FIGS. 5(b) and 5(c)), even when the micro impurity concentration and the bias applied are the same. Accordingly, the variation of the locations of the impurities is reflected in the current-voltage characteristics. As a result, the current characteristics of Schottky diodes greatly vary spontaneously at the time of manufacturing.

The variation in characteristics is smoothed when the junction area has a certain size. In reality, the relationship between the junction area and the impurity concentration is set so as to achieve the widest variation possible.

First Embodiment

Figure 1:
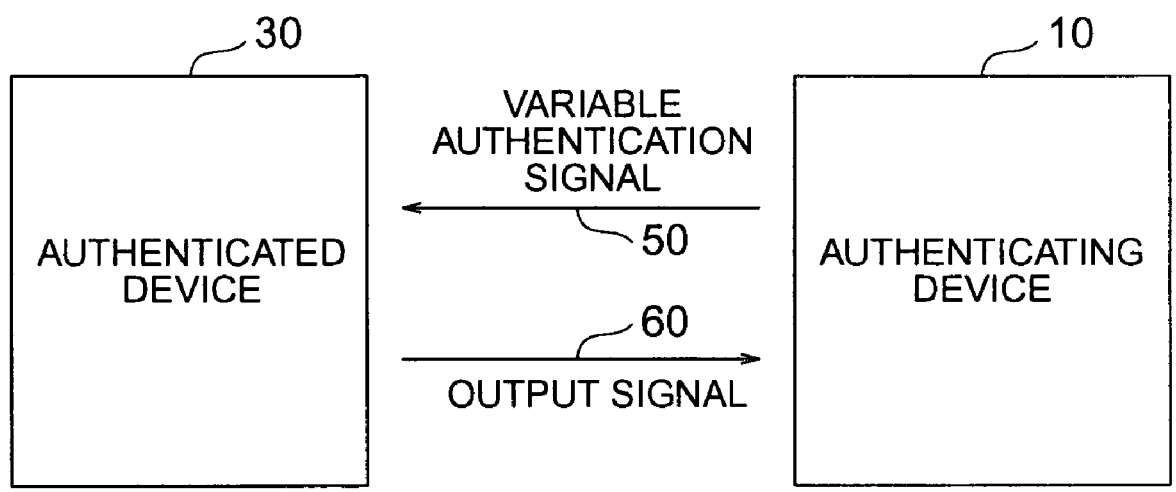
FIG. 1 is a block diagram illustrating the structure of an individual authentication system in accordance with a first embodiment of the present invention.

FIG. 1 illustrates the structure of an individual authentication system in accordance with a first embodiment of the present invention. The individual authentication system of the first embodiment includes an authenticating device 10 and an authenticated device 30 having authenticated elements. The authenticated device 30 has Schottky diodes, for example, as the authenticated elements. The authenticating device 10 transmits a variable authentication signal 50 to the authenticated elements of the authenticated devices 30. Based on an output signal 60 output from the authenticated elements in response to the authentication signal 50, the authenticating device 10 authenticates an individual. In response to the authentication signal 50, the authenticated elements exhibit output characteristics that spontaneously vary with individuals. In this specification, the "variable" authentication signal is an authentication signal that represents a variable value.

Next, how the authenticated elements are implemented in individual authentication in this embodiment is described. First, an output is made with respect to the authentication signal 50 to be input, and the output characteristics of the authenticated elements that spontaneously vary with individuals are measured in advance. At the time of authentication, the authenticated device 30 is determined whether to be a desired object, based on the response characteristics of the authenticated device 30 in response to the variable authentication signal 50 transmitted from the authenticating device 10.

In this embodiment, the authenticated elements of the authenticated device 30 are elements that exhibit output characteristics continuously varying with the variable authentication signal 50. Authentication is then performed by examining the characteristics with the variable authentication signal 50 that can distinguish the characteristics of the elements of the authenticated device 30.

In the conventional art, digital values of "1" and "1" are allotted to output characteristics, and therefore, the device characteristics can be easily replicated.

In this embodiment, on the other hand, the output characteristics of the authenticated device 30 continuously vary with the authentication signal 50. Therefore, to replicate the characteristics of the authenticated device 30, the entire characteristics need to be replicated, which is very difficult. Accordingly, "spoofing" can be prevented. Also, elements that exhibit spontaneously different output characteristics for individuals, such as Schottky diodes, are employed as the authenticated elements. Thus, no additional management cost will be involved as effectively as possible.

Second Embodiment

Figure 6:
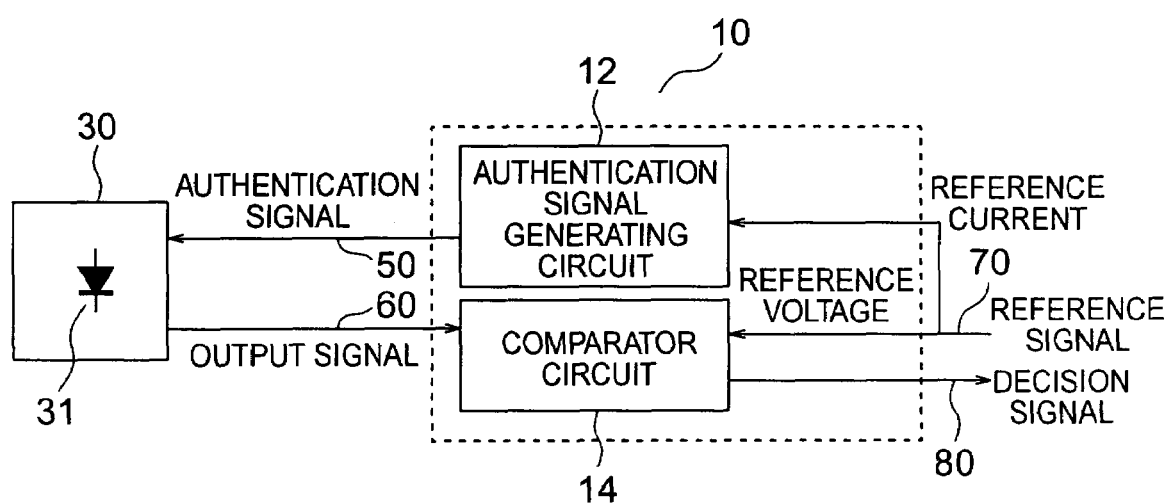
FIG. 6 is a block diagram illustrating the structure of an individual authentication system in accordance with a second embodiment of the present invention.

FIG. 6 illustrates the structure of an individual authentication system in accordance with a second embodiment of the present invention. The individual authentication system of this embodiment includes an authenticating device 10 and an authenticated device 30 having a Schottky diode as an authenticated element 31. The authenticating device 10 includes an authentication signal generating circuit 12 that generates a variable authentication signal 50 to be transmitted to the authenticated device 30 based on a reference current of a reference signal 70, and a comparator circuit 14 that compares an output signal 60 from the authenticated device 30 in response to the authentication signal 50 with a reference voltage of the reference signal 70, and then outputs a decision signal 80. In response to the authentication signal 50, the authenticated element 31 exhibits output characteristics that spontaneously vary with individuals, and the output characteristics are analog characteristics.

In this embodiment, to digitize the analog characteristics, a variable current is used as the authentication signal 50 that is output from the authentication signal generating circuit 12, and a voltage signal is used as the output signal 60 that is output from the authenticated element 31. The comparator circuit 14 then compares the output signal 60 with the variable reference voltage of the reference signal 70. The difference obtained through the comparison is set as digital data.

Figure 7:
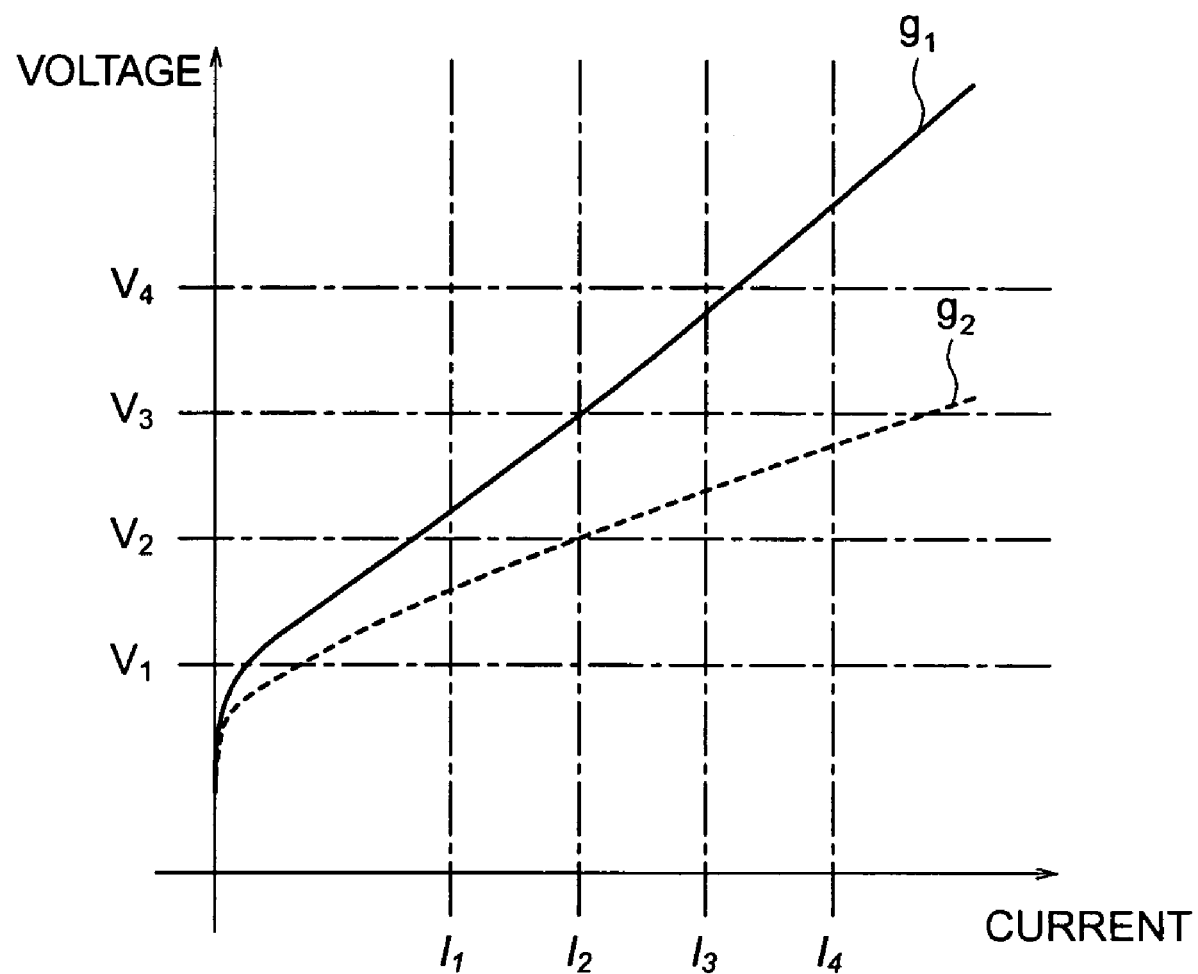
FIG. 7 shows the current-voltage characteristics of Schottky diodes, illustrating the authenticating operation to be performed by the individual authentication system in accordance with the second embodiment.

Referring now to FIG. 7, the authenticating operation to be performed by the individual authentication system of this embodiment is described. FIG. 7 illustrates the authenticating operation of the individual authentication system of this embodiment. In FIG. 7, the characteristics of a first authenticated element and a second authenticated element having different voltage response characteristics with respect to current are represented by a line $g_1$ and a line $g_2$.

The digitized voltage values and current values to be used for authentication are represented by $V_1$ through $V_4$ and $I_1$ through $I_4$. The digitized current values and voltage values are encoded, so as to obtain the following 2-bit digital data with respect to the authentication signal 50 of variable current and the reference signal 70 of variable voltage:

Variable Current:

$00 \rightarrow I_1, 01 \rightarrow I_2, 10 \rightarrow I_3, 11 \rightarrow I_4$ Variable Voltage:

$00 \rightarrow V_1, 01 \rightarrow V_2, 10 \rightarrow V_3, 11 \rightarrow V_4$ When a voltage value that is the value of the output signal 60 from the authenticated element 31 exceeds another voltage value that is the value of the reference signal 70, the comparator circuit 14 outputs a digital signal "1" as the decision signal. When the voltage value that is the value of the output signal 60 is less than the voltage value that is the value of the reference signal 70, the comparator circuit 14 outputs a digital signal "0" as the decision signal.

For example, when the current $I_1$ that is equivalent to a digital signal "00" is input from the authentication signal generating circuit 12 to the first and second authenticated elements, the current $I_1$ flows through the first and second authenticated elements. A voltage that is higher than $V_2$ is then output from the first authenticated element, and a voltage that is lower than $V_2$ is output from the second authenticated element (see the lines $g_1$ and $g_2$ in FIG. 7). If the voltage $V_2$ that is equivalent to a digital signal "01" is sent as a reference voltage of a reference signal to the comparator circuit 14 at this point, a decision signal "1" is output in the case of the first authenticated element, and a decision signal "0" is output in the case of the second authenticated element.

Accordingly, the combinations of the authentication signal 50 and the output signal 60 are recorded in advance, so as to distinguish between the first authenticated element and the second authenticated element.

In the individual authentication system of this embodiment, with one set of input digital signals being a variable current and a variable voltage that are input in this order, the decision signals to be output with respect to the first and second authenticated elements are as follows:
(1) 0000→1 1, (2) 0100→1 1, (3) 1000→1 1,
(4) 1100→1 1, (5) 0001→1 0, (6) 0101→1 ?,
(7) 1001→1 1, (8) 1101→1 1, (9) 0010→0 0,
(10) 0110→? 0, (11) 1010→1 0, (12) 1110→1 0,
(13) 0011→0 0, (14) 0111→0 0, (15) 1011→0 0,
(16) 1111→1 0

However, since there is a limit to the voltage range that can be reliably determined by the comparator circuit 14, the cases that cannot be judged are represented by "?".

Accordingly, in the order shown by the numbers in the brackets, the first and second authenticated elements have the following unique digital information, which are ID numbers:
First authenticated element: 111111110?110001
Second authenticated element: 11110?1100000000

At the time of authentication, it is not necessary to refer to all aspects relating to the ID numbers, but authentication should be performed only with the information sufficient to identify each individual.

While only 1-bit information can be allotted to one element in the conventional art, each authenticated element of this embodiment can hold a large amount of digital information that is inherently difficult to replicate. The above described device characteristics, which are ID numbers, can be processed in the same manner as for regular digital information. However, during authentication, each authenticated element responds in an analog fashion to each analog input signal. Therefore, to replicate the information of only one authenticated element of this embodiment, it is necessary to replicate the current-voltage characteristics of all the diodes corresponding to desired current and voltage steps. If the characteristics of authenticated elements vary spontaneously, it is even more difficult to replicate them. Furthermore, if the number of current and voltage steps to be used for authentication is increased, or if the number of elements is increased as described later, individual authentication can be performed based on digital information that can be read out but cannot be replicated for practical purposes.

When the authenticated element 31 is to be authenticated in the second embodiment, there are various ways to set current and voltage steps. However, depending on how the current and voltage steps are selected, there may be a difference caused in the effect of the authenticated ID number. Therefore, it is necessary to set the current and voltage steps in accordance with the characteristics and the purpose of use of the authenticated device 30. In the case shown in FIG. 7, for example, if a very low input current is selected, the decision signal is "0" with respect to almost all the authenticated elements.

To avoid this problem, a variable current source and a variable voltage source that allow arbitrary setting of current and voltage steps should be used. By arbitrarily setting current and voltage steps every time authentication is performed, the randomness of ID numbers can be conveniently eliminated.

Figure 8:
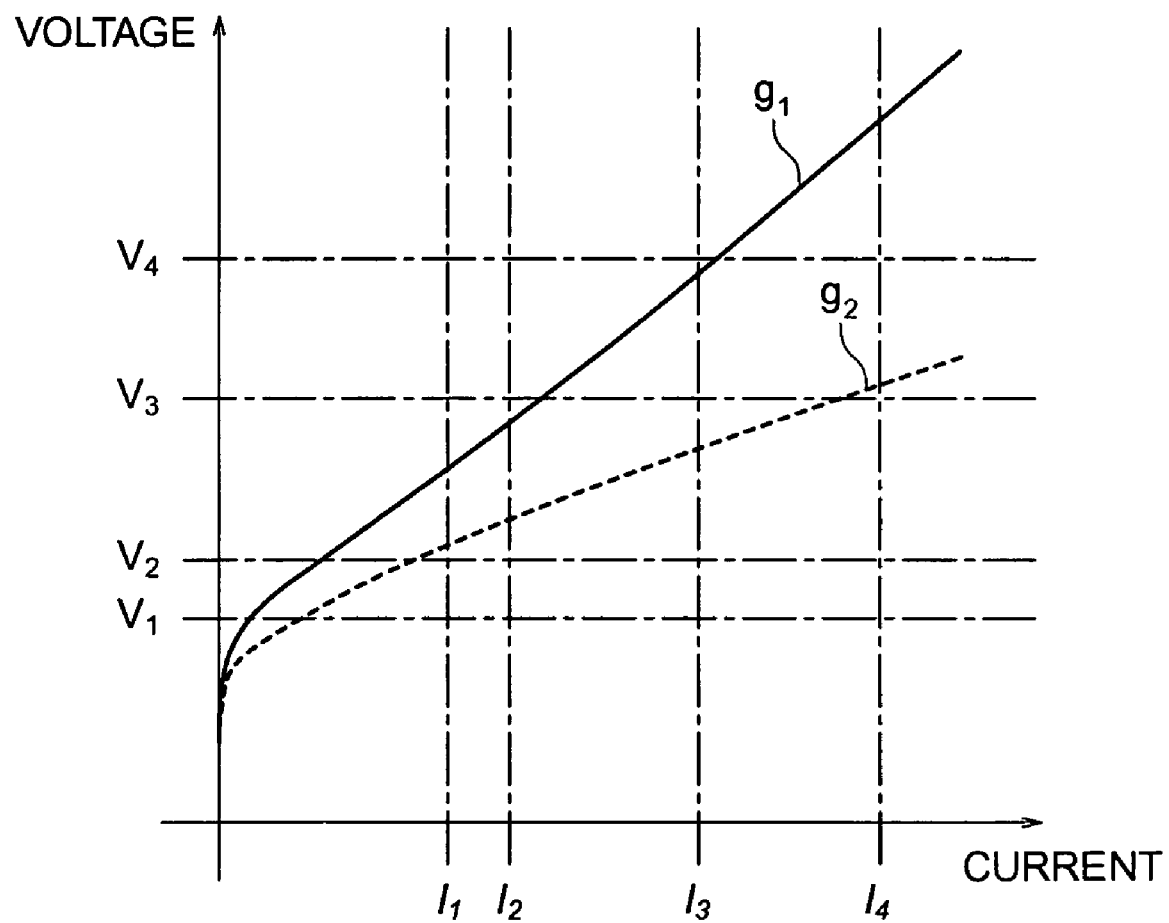
FIG. 8 illustrates the authenticating operation to be performed by the individual authentication system of the second embodiment, using current and voltage steps that are different from those shown in FIG. 7.

Also, as shown in FIG. 8, by randomly setting the steps, the randomness of ID numbers can be reduced.

Figure 9:
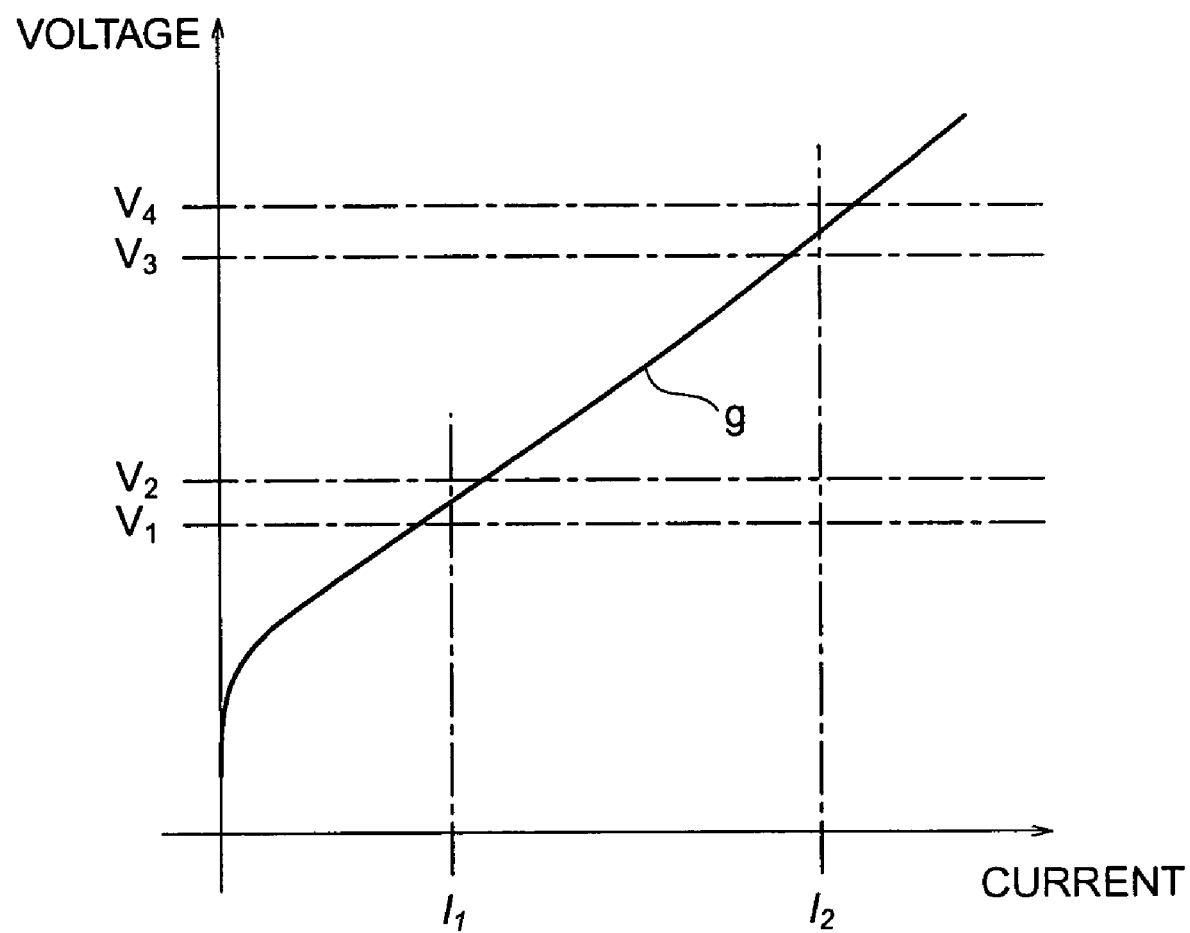
FIG. 9 illustrates another authenticating operation to be performed by the individual authentication system in accordance with the second embodiment.

Further, in a case where a device to be authenticated is determined in advance, current and voltage steps are set so that the characteristics of the device are traced, as shown in FIG. 9.

Figure 10:
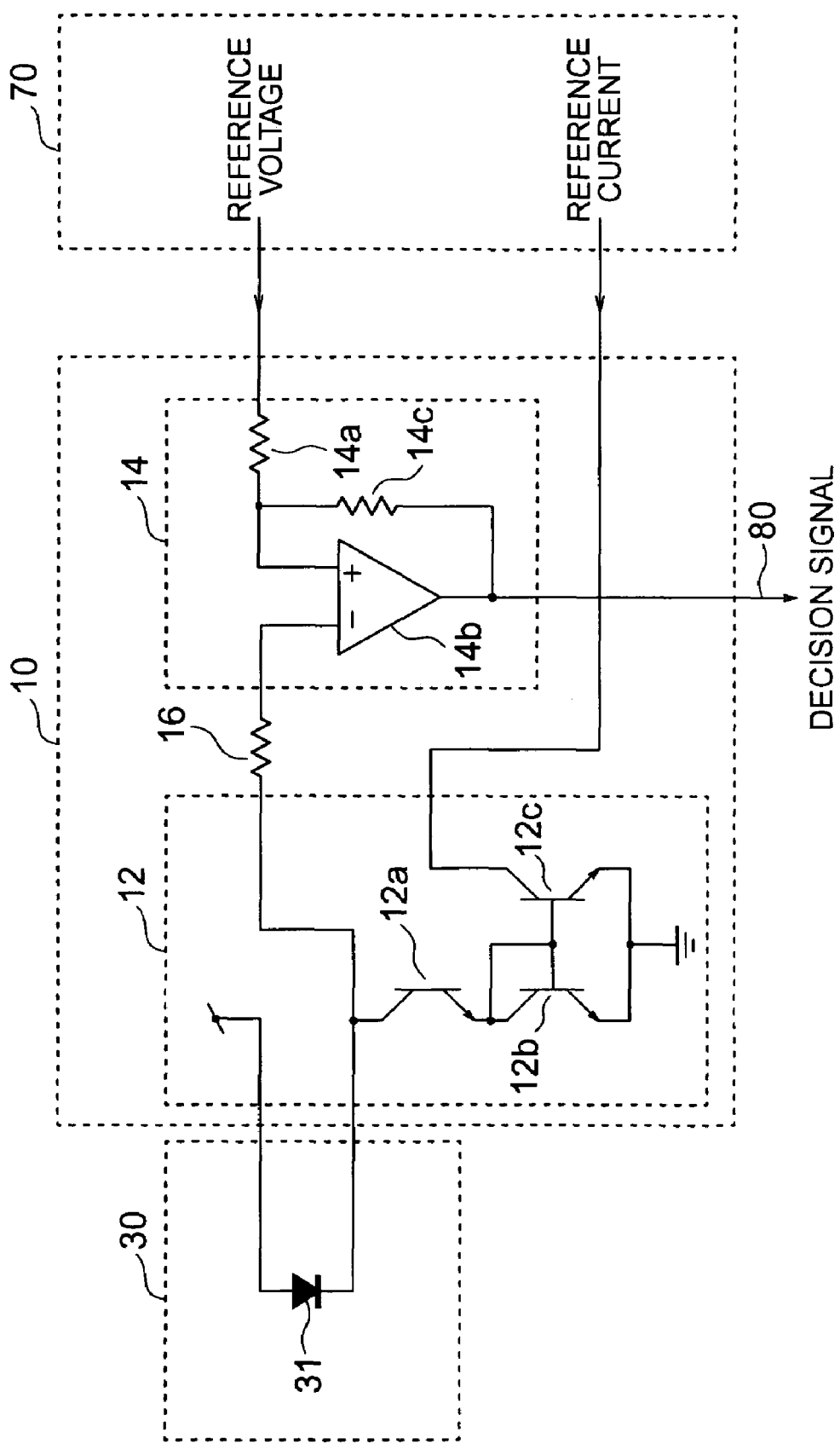
FIG. 10 is a circuit diagram illustrating a specific example of the individual authentication system in accordance with the second embodiment.

FIG. 10 shows a specific circuit diagram of the individual authentication system of this embodiment. In this specific example, the authentication signal generating circuit 12 is a current mirror circuit that includes bipolar transistors 12a, 12b, and 12c. The comparator circuit 14 is a voltage comparator circuit that includes resistors 14a and 14c and a comparator 14b. Further, a resistor 16 for obtaining the output voltage of the Schottky diode 31 is interposed between the current mirror circuit and the voltage comparator circuit. An appropriate reference current and an appropriate reference voltage are applied as the reference signal 70 to the authentication signal generating circuit 12 and the comparator circuit 14, so as to obtain the decision signal 80. Based on the decision signal 80, authentication is performed.

Third Embodiment

Figure 11:
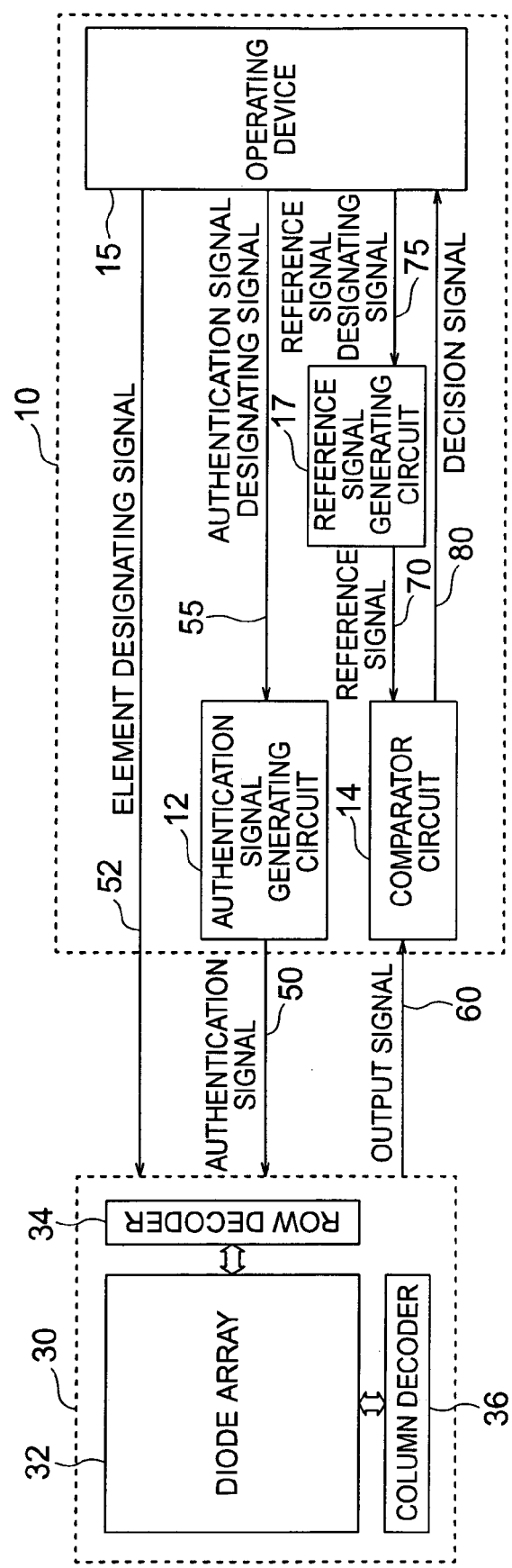
FIG. 11 is a block diagram illustrating the structure of an individual authentication system in accordance with a third embodiment of the present invention.

FIG. 11 illustrates the structure of an individual authentication system in accordance with a third embodiment of the present invention. The individual authentication system of this embodiment includes an authenticating device 10 and an authenticated device 30 having authenticated elements. The authenticating device 10 includes an authentication signal generating circuit 12, a comparator circuit 14, an operating device 15, and a reference signal generating circuit 17. At the time of authentication, the operating device 15 transmits an element designating signal 52 to the authenticated device 30, an authentication signal designating signal 55 to the authentication signal generating circuit 12, and a reference signal designating signal 75 to the reference signal generating circuit 17. The element designating signal 52 is to designate at least one authenticated element from the authenticated elements of the authenticated device 30. The authentication signal designating signal 55 is to designate an authentication signal to be generated from the authentication signal generating circuit 12. The reference signal designating signal 75 is to designate a reference signal to be generated from the reference signal generating circuit 17.

Figure 12:
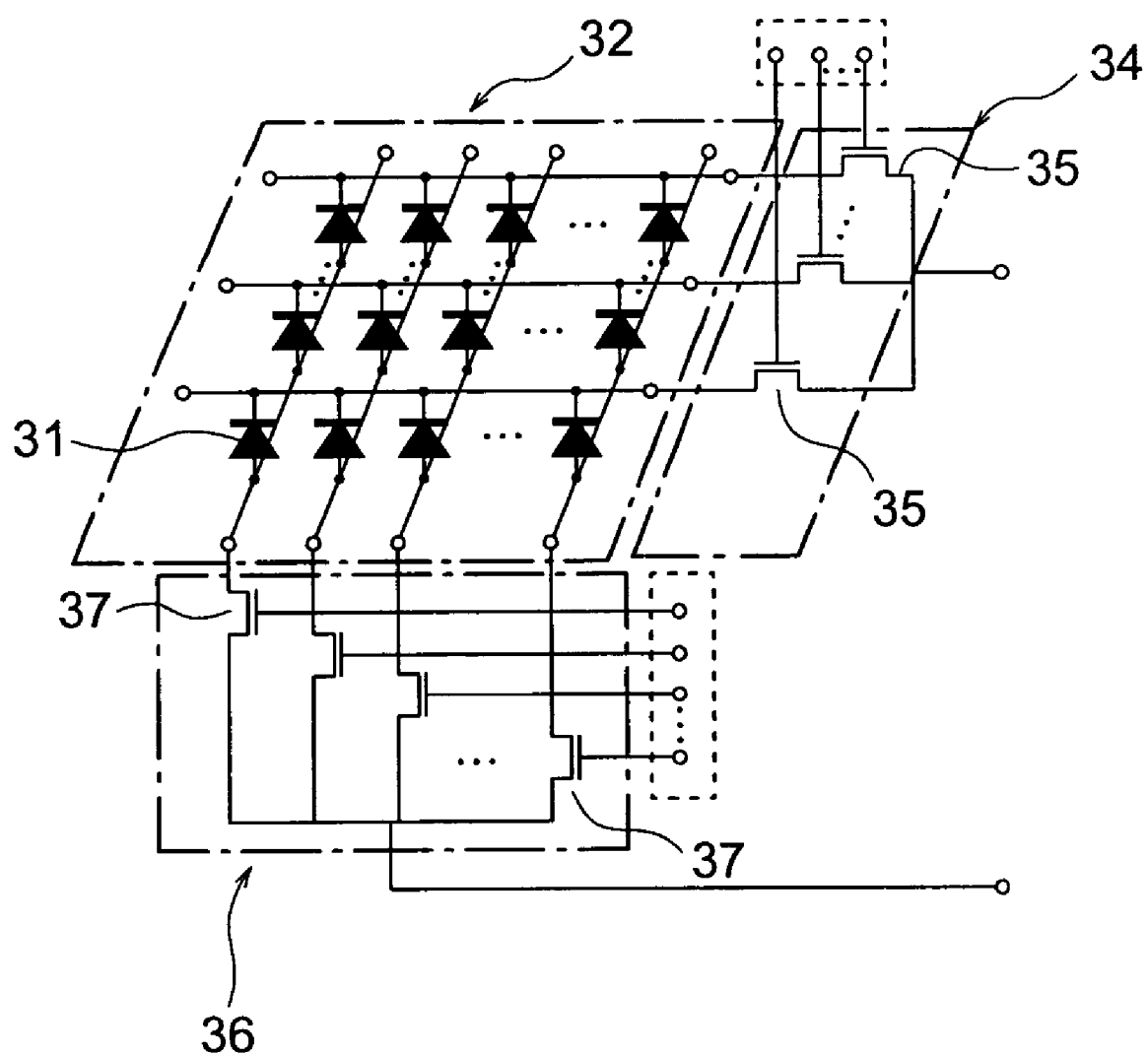
FIG. 12 illustrates the structure of a specific example of the authenticated device of the individual authentication system in accordance with the third embodiment.

The authenticated device 30 includes a diode array 32, a row decoder 34, and a column decoder 36. The diode array 32 has Schottky diodes as authenticated elements arranged in a matrix fashion. The row decoder 34 decodes a row address signal obtained from the element designating signal 52, and selects one row from the matrix. The column decoder 36 decodes a column address signal obtained from the element designating signal 52, and selects one column from the matrix. The authenticated device 30 includes a decoder (not shown) to obtain the row address signal and the column address signal from the element designating signal 52. FIG. 12 shows a circuit diagram of a specific example of the authenticated device 30. The diode array 32 is formed with Schottky diodes 31 arranged in a matrix fashion. The row decoder 34 includes row selection transistors 35, and the column decoder 36 includes column selection transistors 37. As the row address signal is decoded by the row decoder 34, one of the row selection transistors 35 is selected and turned ON. As the column address signal is decoded by the column decoder 36, one of the column selection transistors 37 is selected and turned ON. The Schottky diode 31 located in the vicinity of the point at which the row connected to the selected row selection transistor 35 crosses the column connected to the selected column selection transistor 37 is selected. Here, the authentication signal generating circuit 12 applies a variable current that is the authentication signal 50 to the selected Schottky diode 31. The comparator circuit 14 then compares the voltage that is the output signal 60 of the Schottky diode 31 with the reference voltage of the reference signal 70. The decision signal 80 obtained as a result of the comparison is transmitted from the comparator circuit 14 to the operating device 15, and individual authentication is performed on the selected element to be authenticated.

As described above, in this embodiment, the authenticated device 30 includes more than one authenticated element 31. Thus, individual authentication can be performed with higher reliability.

Although the operating device 15 performs individual authentication on an authenticated element 31 based on the decision signal 80 in this embodiment, it is possible to omit the operating device 15 from the structure.

(First Modification of Third Embodiment)

If two or more authenticated elements can be arbitrarily selected at once in the third embodiment, the combined characteristics of the two or more elements can be used for authentication. For example, when an authentication signal is input designating two or more authenticated elements 31 at once, an output signal that is a combination of the characteristics of the two or more authenticated elements 31 is obtained. As the characteristics of the authenticated elements 31 vary, the characteristics of the output signal from the authenticated elements 31 vary depending on the element designating signal. The output signal from the authenticated elements 31 can also be used as a unique ID number.

(Second Modification of Third Embodiment)

As a number of authenticated elements are employed as in the third embodiment illustrated in FIGS. 11 and 12, each authenticated element can hold information of more than one bit. Accordingly, a highly reliable individual authentication system that can prevent "spoofing" while transferring completely digitized data can be realized by carrying out the following authenticating procedures:

Step 1: the number of bits to be used for authentication is determined;

Step 2: a seed authentication signal that designates an address, an authentication signal, and the likes is supplied from the authenticating device 10;

Step 3: a decision signal in response to the supplied authentication information is output from the authenticated device 30;

Step 4: the information of the next authentication signal is automatically formed using the information of the decision signal and the authentication signal at the authenticated device; and Step 5: the procedures of Steps 3 and 4 are repeated the same number of times as the number of bits determined in Step 1.

In accordance with the above procedures, only the seed authentication signal is input from the authenticating device 10, and, in response to that, an output signal of a predetermined number of bits is obtained from the authenticated device 30. The output signal in response to the seed authentication signal is a random bit string, and only the authenticating device 10 that holds all the information of the authenticated device 30 can estimate the output signal only from the seed authentication signal.

So as to do "spoofing" in this authentication system, all possible output signals in response to all possible seed authentication signals need to be recorded, the information in the authenticated device 30 needs to be read out, or the information as to the authenticated device 30 needs to be stolen from the authenticating device 10. The measures against any of the above can be easily taken.

Furthermore, the seed authentication signal and the output signals are digital data that are easy to handle. For example, authentication via the Internet can be performed, while high security is maintained.

There is such a specific example as follows.

The authenticated elements 31 are arranged in an array of 15×15, and an authentication signal is generated from the authentication signal generating circuit 12 in response to 4-bit digital data. The format of the seed authentication signal is set as follows: (column address: 4 bits) (row address: 4 bits) (input signal information: 4 bits).

For example, if a seed input signal of "1101 1010 1100" is supplied, a decision signal in response to the authentication signal of "1100" of the authenticated element 31 located at the 13th column and the 10th row in the authenticated device 30 is the first output, which is "0", for example.

A bit-shifting operation is then performed by linking the decision signal to the last bit of the seed authentication signal and removing the first bit from the seed authentication signal, to obtain a new authentication signal of "1011 0101 1000". In response to the new authentication signal, a decision signal is obtained, and the above described operation is repeated.

Fourth Embodiment

Figure 13:
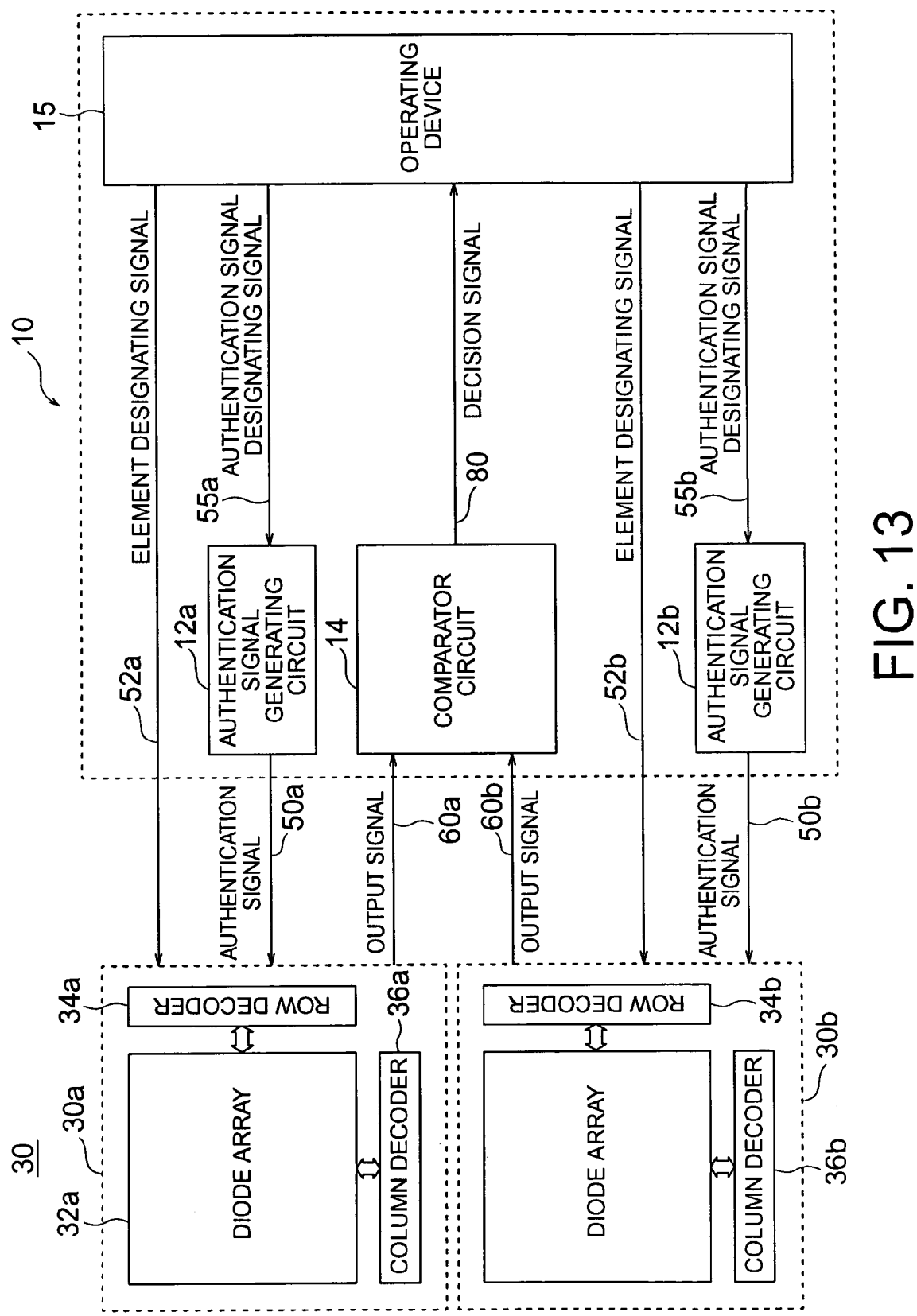
FIG. 13 is a block diagram illustrating the structure of an individual authentication system in accordance with a fourth embodiment of the present invention.

FIG. 13 illustrates the structure of an individual authentication system in accordance with a fourth embodiment of the present invention. The individual authentication system of this embodiment includes an authenticating device 10 and an authenticated device 30. The authenticated device 30 includes a first authenticated unit 30a and a second authenticated unit 30b. The first authenticated unit 30a includes a diode array 32a, a row decoder 34a, and a column decoder 36a. The diode array 32a has Schottky diodes as authenticated elements arranged in a matrix form. The row decoder 34a decodes a row address signal obtained from an element designating signal 52a, and selects a row from the matrix. The column decoder 36a decodes a column address signal obtained from the element designating signal 52a, and selects a column from the matrix. The second authenticated unit 30b includes a diode array 32b, a row decoder 34b, and a column decoder 36b. The diode array 32b has Schottky diodes as authenticated elements arranged in a matrix form. The row decoder 34b decodes a row address signal obtained from an element designating signal 52b, and selects a row from the matrix. The column decoder 36b decodes a column address signal obtained from the element designating signal 52b, and selects a column from the matrix.

The authenticating device 10 includes authentication signal generating circuits 12a and 12b, a comparator circuit 14, and an operating device 15. The operating device 15 transmits the element designating signal 52a to the first authenticated unit 30a, the element designating signal 52b to the second authenticated unit 30b, an authentication signal designating signal 55a to the authentication signal generating circuit 12a, and an authentication signal designating signal 55b to the authentication signal generating circuit 12b. The authentication signal generating circuit 12a transmits an authentication signal 50a to the first authenticated unit 30a. The authentication signal generating circuit 12b transmits an authentication signal 50b to the second authenticated unit 30b. The comparator circuit 14 performs determination based on output signals 60a and 60b from the first and second authenticated units 30a and 30b, and transmits a decision signal 80 to the operating device 15.

In this embodiment, the comparator circuit 14 determines which output signal is the greater between two authenticated elements corresponding to the element designating signals 52a and 52b and the authentication signals 50a and 50b input from the authenticating device 10. The comparator circuit 14 then outputs the result of the comparison. With this structure, the output signals can be digital signals. Accordingly, stable operations can be expected, as long as the precision of input signals is maintained.

Although each output signal generated in response to an authentication signal is compared with a reference signal in the first through fourth embodiments, there are cases where the control of the reference signal is difficult, such as a case where the characteristics of authenticated elements vary with temperature or a case where a reference signal generating circuit is mounted together with authenticated elements. In such cases, the difficulty is easily eliminated by using an output signal of another authenticated element as the reference signal.

In a case where Schottky diodes are employed, for example, a voltage V may be used as an input signal, and a current I may be used as an output signal. In such a case, the current I can be expressed as: $I = A \times \exp(-(qV)/(kT))$, where A represents a constant that varies among elements, q represents the elementary charge, k represents the Boltzmann constant, and T represents the temperature.

When the temperature varies, the reference voltage should be varied accordingly. Otherwise, the decision signal differs from an estimated value. In the fourth embodiment, however, the outputs of two elements are compared with each other. Since the relationship between the two outputs does not depend on the temperature, such a problem is not caused.

By implementing the individual authentication system of any of the first through fourth embodiments, a data conversion element with which only the individual that has instructed data conversion can restore the original data can be realized. For example, an output signal in response to a seed input is a random bit string unique to the individual, and therefore, there is not a way to acquire this information from the outside. Accordingly, after target data is reversibly converted using such unique information, only the individual who has instructed the conversion can restore the original data. It is of course possible to reconvert the data, only if the information is read from the device in advance.

(Benefits of Using Schottky Diodes as Authenticated Elements)

In each of the above descried embodiments, Schottky diodes are employed as elements to be authenticated. The benefits of using Schottky diodes are as follows:

a) Compared with the elements employed in the conventional art, there is a very wide variation in characteristics, and therefore, Schottky diodes are suitable as authenticated elements.

b) Unlike an authenticated element in the conventional art, a Schottky diode as an authenticated element does not include a MOS structure. Accordingly, there is neither deterioration of characteristics due to breaking of insulating film or BT stress, nor deterioration with time due to hot carriers or the likes. Thus, an inexpensive and stable system can be achieved.

c) The characteristics of Schottky diodes exhibit very low dependence on temperature. Accordingly, an inexpensive and stable system that has a very high environment resistance can be achieved.

Particularly, the point b) is important. The deterioration of characteristics due to BT stress is unavoidable deterioration with time in the case where authenticated elements including MOS structures are employed. Therefore, a conventional system needs to be designed and operated, with the deterioration with time being taken into consideration. This results in an increase in total operational cost. To counter this problem, Schottky diodes are employed as authenticated elements. Since Schottky diodes do not include a MOS structure, there is virtually no need to take measures against deterioration with time.

As an example of authenticated elements that do not include a MOS structure, Japanese Patent Laid-Open Publication No. 2001-7290 discloses an example structure that employs diode elements including polycrystalline structures and a capacitor. In this example structure, however, the variation in characteristics is measured by the variation in the bulk conductivity and capacity. Therefore, the variation is much narrower than the variation in characteristics of Schottky diodes that is measured by the variation at the interface. Furthermore, even if the variation is to be widened and the degree of integration is to be increased in this example structure, the size of the elements cannot be made smaller than the crystal grain size.

(Examples of Authenticated Elements Other than Schottky Diodes)

Although Schottky diodes are employed as authenticated elements in the first through fourth embodiments, any elements can be employed as long as they have characteristics that spontaneously vary at the time of manufacturing. For example, it is possible to utilize the characteristics of single electron transistors (SET), Schottky transistors, Schottky diodes with gates, and tunnel diodes with insulating film. It is of course possible to employ short gate transistors and TFT transistors as authenticated elements, as in the conventional art.

The authenticated device of each of the first through fourth embodiments may be embodied by a card in which authenticated elements and other elements are embedded.

As described above, in each of the embodiments of the present invention, the variation in characteristics of Schottky diodes is regarded as spontaneous response characteristics. Accordingly, the randomness of the response characteristics is much less than the randomness of the response characteristics in the conventional art. Also, the circuit for detecting the variation is prevented from becoming complicated. Furthermore, as the process for manufacturing regular semiconductor devices can be employed for manufacturing Schottky diodes, no additional production costs will be involved, unlike in the case of the conventional art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. An individual authentication system comprising:
   an authenticated device that includes at least one authenticated element that generates an output signal with characteristics spontaneously varying, at the time of manufacturing, with respect to a continuous input signal, the characteristics of the authenticated element being used as information unique to an individual; and
   an authenticating device that inputs a variable authentication signal as the input signal to the authenticated element of the authenticated device, and performs individual authentication on the authentication device, the authenticating device using the variable authentication signal in distinguishing the characteristics of the authenticated element.

2. The individual authentication system as claimed in claim 1, wherein the authenticating device includes a signal generating circuit that generates the authentication signal and a comparator circuit that compares the output signal from the authenticated element with a reference signal, and performs individual authentication on the authenticated device, based on an output of the comparator circuit.

3. The individual authentication system as claimed in claim 2, wherein the output of the comparator circuit is digital data unique to the authenticated element, the digital data being set in accordance with the output signal from the authenticated element and the reference signal.

4. The individual authentication system as claimed in claim 2, wherein:
   the authenticated device includes a plurality of the authenticated elements; and
   the authenticating device transmits a signal to select at least one authenticated element from the plurality of authenticated elements, and includes a unit that performs individual authentication on the authenticated device, based on the output of the comparator circuit in response to the output signal of the selected authenticated element.

5. The individual authentication system as claimed in claim 4, wherein the output of the comparator circuit is digital data unique to the selected authenticated element, the digital data being set in accordance with the output signal from the authenticated element and the reference signal.

6. The individual authentication system as claimed in claim 2, wherein the authenticating device includes a reference signal generating circuit that generates the reference signal.

7. The individual authentication system as claimed in claim 1, wherein the authenticated element is at least one of a Schottky diode, a Schottky transistor, and a Schottky diode with a gate.

8. The individual authentication system as claimed in claim 1, wherein the authenticated device includes an array in which a plurality of the authenticated elements are arranged in a matrix fashion, and a selecting circuit that selects at least one authenticated element from the array.

9. An individual authentication system comprising:
   a first authenticated unit that includes a first array in which authenticated elements that generate output signals with characteristics spontaneously varying, at the time of manufacturing, in response to a continuous input signal, are arranged in a matrix form, and a first selecting circuit that selects at least one authenticated element from the first array;
   a second authenticated unit that includes a second array in which authenticated elements that generate output signals with characteristics spontaneously varying, at the time of manufacturing, in response to a continuous input signal, are arranged in a matrix form, and a second selecting circuit that selects at least one authenticated element from the second array;
   an operating unit that transmits a first element designating signal to the first selecting circuit to designate an authenticated element in the first array, and a second element designating signal to the second selecting circuit to designate an authenticated element in the second array, so that the authenticated elements are selected from both the first array and the second array;
   a first authentication signal generating circuit that generates and transmits a first variable authentication signal to the authenticated element selected from the first array, the first authentication signal generating circuit using the first variable authentication signal in distinguishing the characteristics of the authenticated elements in the first array;
   a second authentication signal generating circuit that generates and transmits a second variable authentication signal to the authenticated element selected from the second array, the second authentication signal generating circuit using the second variable authentication signal in distinguishing the characteristics of the authenticated elements in the second array; and
   a comparator circuit that compares a first output of the authenticated element selected from the first array with a second output of the authenticated element selected from the second array, the first output being made in response to the first variable authentication signal, the second output being made in response to the second variable authentication signal.

10. The individual authentication system as claimed in claim 8, wherein the authenticated elements are at least one of a plurality of Schottky diodes, a plurality of Schottky transistors, and a plurality of Schottky diodes with gates.

* * * * *